United States Patent

[11] 3,622,492

| [72] | Inventor | Layton C. Kinney<br>Chicago, Ill. |
|---|---|---|
| [21] | Appl. No. | 784,822 |
| [22] | Filed | Dec. 18, 1968 |
| [45] | Patented | Nov. 23, 1971 |
| [73] | Assignee | IIT Research Institute<br>Chicago, Ill. |

[54] OZONE GENERATOR
7 Claims, 6 Drawing Figs.

[52] U.S. Cl.................................................. 204/322,
204/176
[51] Int. Cl...................................................... C22d 7/08
[50] Field of Search........................................ 204/322,
313, 314, 315, 316, 317, 318, 319

[56] References Cited
UNITED STATES PATENTS

| 3,335,080 | 8/1967 | Waller et al. ................. | 204/313 X |
| 2,345,798 | 4/1944 | Daily............................ | 204/318 |

FOREIGN PATENTS

| 187,558 | 1918 | Great Britain............... | 204/318 |

Primary Examiner—John H. Mack
Assistant Examiner—Neil A. Kaplan
Attorney—Fitch, Even, Tabin & Luedeka ABSTRACT: To provide a compact ozone generator, films of polymeric material are employed as dielectrics in combination with flat, planar electrodes to produce ozone by silient electrical discharge in an oxygen containing gas stream. The electrodes and dielectrics are cooled by the gas stream which is recycled across the electrodes and dielectrics and through an external heat exchanger.

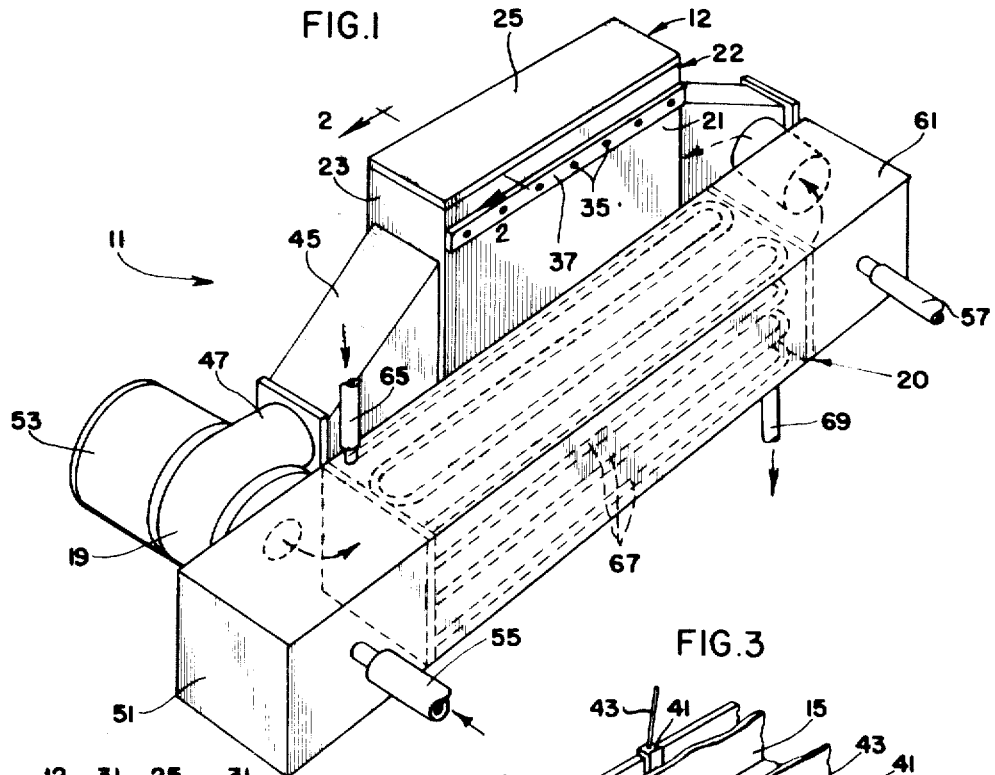
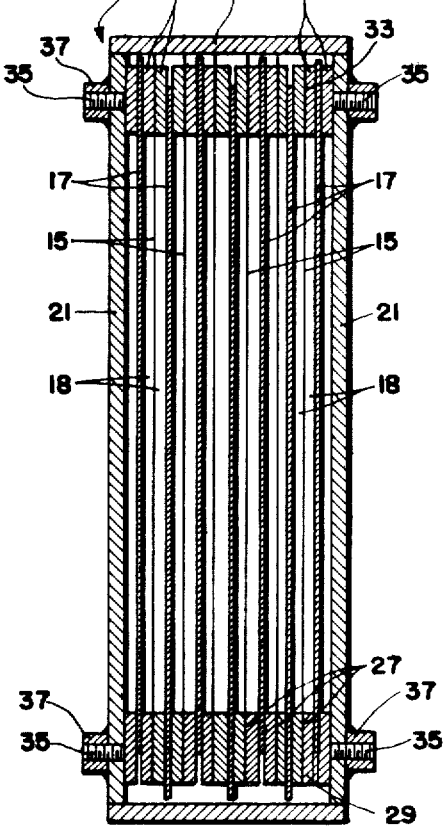
INVENTOR
LAYTON C. KINNEY

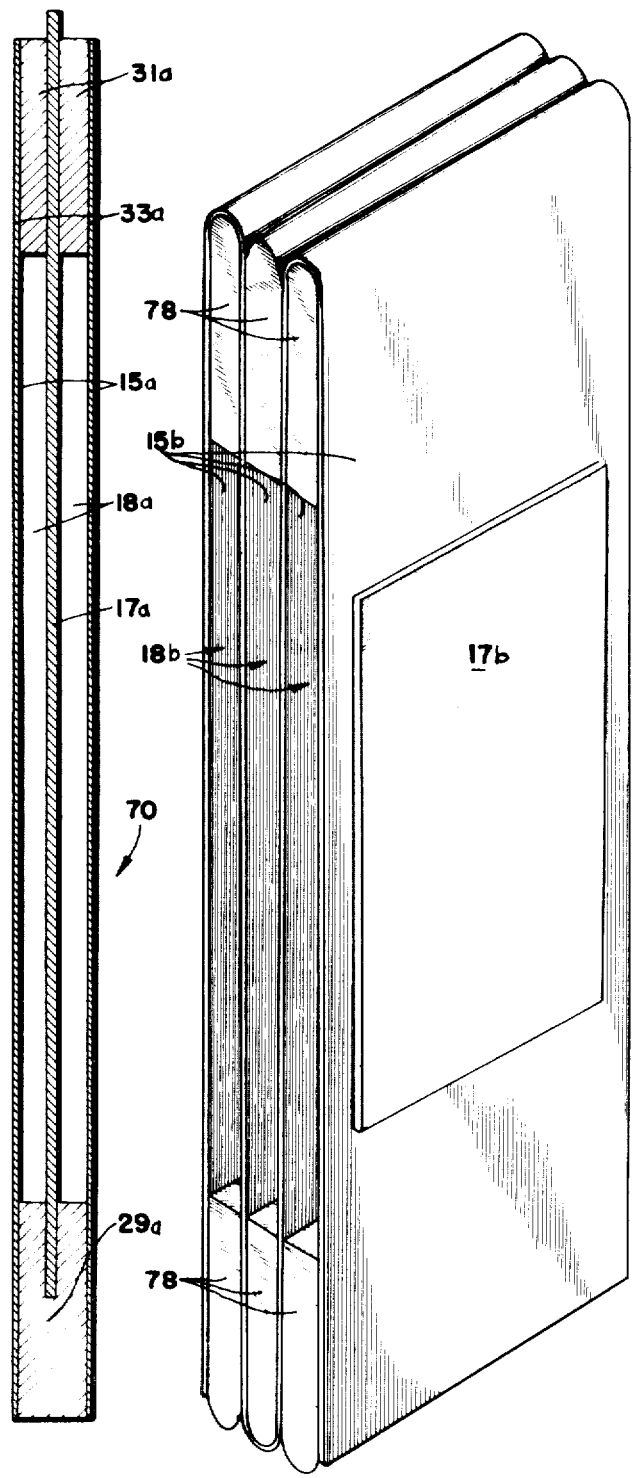
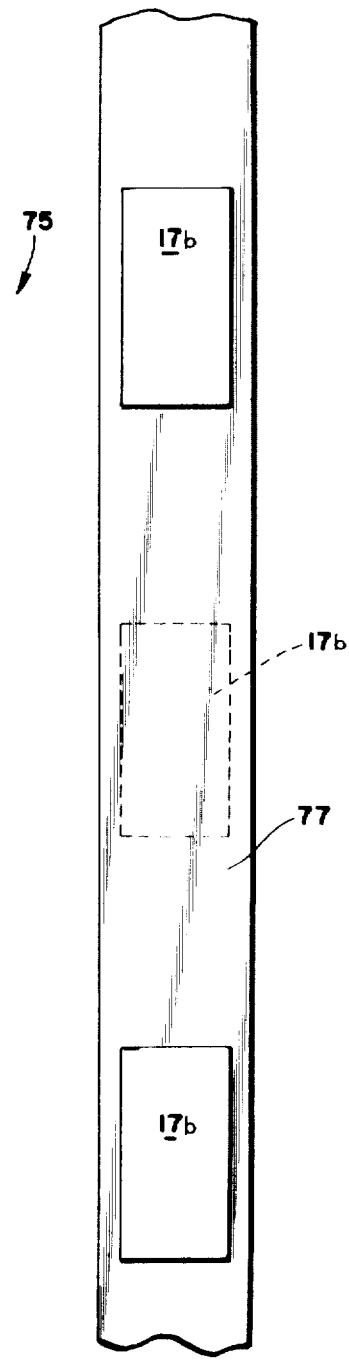
INVENTOR
LAYTON C. KINNEY

OZONE GENERATOR

This invention relates to a method of and an apparatus for producing ozone by silent electrical discharge in an atmosphere of gaseous oxygen, oxygen enriched air or air and, more particularly, to generating commercially usable concentrations and volumes of ozone.

Ozone is a powerful oxider and in the presence of water is an excellent bleaching agent. The volume of ozone used in many industrial processes and in the treatment of water and wastes is increasing. One of the primary drawbacks to faster growth of use of ozone is that present commercially used ozone generators are costly and bulky. For example, it has been estimated that to produce a ton a day of ozone with commercial equipment requires a volume of 600 to 1200 cubic feet of generating volume. Bulky ozone generators of the conventional type are too costly for many small size installations, such as a small industrial plant or a small water purification plant, and are inordinately heavy for use as portable units.

One common ozone generator is the concentric tube type in which oxygen or air to be treated passes through an annular space between the concentric tubes with one of the tubes being made of metal and the other made of dielectric material, usually glass or ceramic. In some instances, both the inner and outer tubes are water cooled, while in other instances only the outer tubes are water cooled. On the side of the dielectric tube opposite the metal electrode tube is a conductive, metallic coat or material for establishing a silent electrical discharge across the annular space to create the ozone. Another commercial type of ozone generator is a so called plate type which has a series of parallel plates spaced from one another and cooled by circulating water in hollow spaces within the electrode plates. A suitable dielectric plate of glass is disposed between electrode plates which are usually aluminum or stainless steel. The concentration of ozone in the gas stream leaving the ozone generator may vary considerably, e.g., from less than 1 percent to more than 10 percent by weight with better yields being obtained when using oxygen and a thorough drying of the incoming air or oxygen. These ozone generators are those most commonly used and are noted for their large size and high initial cost. While many suggestions have been made in the prior art as to various other systems or expedients, these have not been adopted on a large commercial scale.

Accordingly, an object of the invention is to provide an inexpensive and compact ozone generator as compared with commercial ozone generators of the foregoing kind.

Other objects and advantages of the invention will become apparent from the detailed description taken in connection with the accompanying drawings in which:

FIG. 1 is a perspective view of an ozone generating apparatus embodying the novel features of the invention;

FIG. 2 is an enlarged cross-sectional view taken substantially along the lines 2—2 of FIG. 1;

FIG. 3 is a fragmentary perspective view of dielectrics and electrodes of FIG. 2 and attached electrical conductors;

FIG. 4 is a sectional view of an electrode and dielectric unit constructed in accordance with a further embodiment of the invention;

FIG. 5 is a perspective view of another embodiment of a dielectric and electrode unit; and FIG. 6 is an illustration of a dielectric material on which are electrodes for forming the unit of FIG. 5.

As shown in the drawings for purposes of illustration, the invention is embodied in a method of and an apparatus 11 for generating ozone in a gas stream, which may be air, oxygen-enriched air, or gaseous oxygen by a silent electric discharge in an ozone-generating station 12. The size, i.e., bulk or volume, of the generating station 12 is quite reduced from that of conventional ozone generators as the conventional glass plate dielectrics have been replaced with much thinner dielectrics 15 of a polymeric material, preferably thin films of a polymeric material, which have better dielectric strengths than glass. By use of flat plate electrodes 17 and by tensioning the film dielectrics 15 into flat, parallel planes, large generating surfaces may be provided much more economically than by large, water tight tubes or castings of the prior art. Also of considerable significance in the reduction of bulk of the generating station 11, is the elimination of the space and materials used to water cool the dielectrics 15 and electrodes 17 and the use of a high velocity flow of the gas stream itself to cool the dielectrics 15 and electrodes 17. As will be explained in greater detail, the gas stream is circulated by a blower 19 through spaces 18 between the electrode plates and dielectrics at a high velocity as compared to the velocity of airflow in conventional Otto or Welsbach ozone generators. Also, the dielectrics 15 and electrodes 17 have a surface area to mass ratio considerably in excess of the surface area to mass ratio of the conventional dielectrics and electrodes which had to carry and withstand pressure from the cooling water.

The high-velocity flow of the gas stream through the generating station 12 for cooling works at cross purposes to the development of the commercially desired concentration of ozone in the gas stream; but it has been found that by proper recycling of the gas stream through the generating station 12, ozone concentrations can be achieved sufficient for commercial uses. As the gas stream recirculates, it is sent through a heat exchanger 20 which is independent of and preferably external of the generating station 12. Thus, it will be seen that the heat exchange function is separated from the ozone-generating function in the present invention in contrast to the conventional commercial ozone generators, in which the generating and heat exchange functions are interrelated and combined within the ozone-generating area. As the heat exchanger 20 need not be built in a manner to accomplish the silent electrical discharge, the heat exchanger may be of a conventional kind or type which is designed for and achieves efficiencies in heat transfer not realized in the heat exchange portions of prior art ozone generators.

Referring now in greater detail to the illustrated apparatus, and more particularly, to the generating station 12 which includes an enclosed and sealed housing 22 formed of vertical sidewall 21 joined to vertical end walls 23. The end and sidewalls are joined and sealed to top and bottom walls 25 to prevent entrance of ambient air into the generating space or leaking of ozone from the interior of the housing.

Suitably supported within the interior of the housing 22 are the dielectrics 15 which are chosen primarily for their dielectric strengths which are at least several and up to 10 times the dielectric strength of glass. Also, of importance to the choice of the dielectric material is its ability to resist deterioration by ozone. The preferred dielectrics 15 are thin films of a polymeric material such as Mylar polyester or Kapton polyimide R/M films sold by E. I. DuPont de Nemours Corporation, Celanar polyester film sold by Celanese Corporation, Teflon TFE tetrafluroethylene polymer sold by Raybestos Manhattan Corporation, balanced biaxially oriented polypropylene sold by Hercules Corporation and Lexan polycarbonate sold by General Electric Company. The films may have a thickness in the range of about 0.5 mil to 10 mils with films of 3 to 5 mils thick being preferred, whereas typical dielectric glass plate or tubes in the prior art ozone generators are about 0.100 to 0.125 inch thick. This reduction in the amount of bulk or volume occupied by the dielectrics allows a greater percentage of the space to be occupied by the gas stream with a resultant greater output per cubic foot of the generating station. It is estimated that dielectrics and electrodes occupy as much as 25 percent of the volume of conventional plate or tube ozone generators. Also, in contrast to conventional generators, neither the electrodes 17 or the dielectrics 15 of the present generator need have thick and sealed walls to contain and withstand hydrostatic pressure from the cooling water.

The preferred electrodes 17 are solid and made of aluminum or stainless steel which does not readily corrode in the presence of ozone or catalyze its decomposition. The illustrated electrode plates are flat and rectangular and are about 0.020–0.030 inch thick as contrasted to about 0.125-inch walls for electrodes used to withstand hydrostatic pressures in a conventional tube type ozone generator. For instance, in a conventional ozone generator of the water cooled kind, a generator unit consisting of ground electrode, dielectric, gap therebetween and high voltage electrode may be 0.5 inch in width as contrasted to 0.100-inch width for the described apparatus when using a 0.070-inch space across a pair of electrodes 17, a dielectric 15 and gaps 18 therebetween. In the illustrated apparatus, the electrode plates are sufficiently thick to add rigidity to the unit; but where this rigidity is not needed, the thickness of the electrode may be reduced substantially. Electrodes ranging from one to 30 mils thick are contemplated. Also, to reduce the volume of the unit, the gaps 18 may be reduced in width to such as, for example, 20 mils.

As the preferred form of film dielectrics 15 are nonrigid and are non-self-sustaining, the films must be supported and arranged in the housing 22 to be substantially flat in shape and disposed parallel with the electrodes 17. If the dielectrics are not parallel to the electrodes, a decrease in ozone-generating efficiency is experienced. A preferred manner of supporting the dielectrics is to clamp lower ends 27 of the dielectrics 15 between lower spacers 29 and to hold the dielectrics taut and under tension between the lower spacers 29 and a series of upper spacers 31. The spacers 29 and 31 are in the form of blocks of an insulating material with flat parallel, vertically disposed walls 33. The spacers 29 and 31 are, in this instance, secured to the plate electrodes 17 by a suitable adhesive along one of the walls 33 and the other of the walls 33 are free to abut the dielectrics disposed between adjacent spacers.

In this instance, the spacers 29 and 31 are held in compression by means of sets of opposed, adjusting screws 35 threaded in suitable bars 37 extending across the top and bottom of each of the housing sidewalls 21. The inner ends of the adjusting screws 35 abut the walls 33 of the outermost spacers 29 and 31, and the screws are suitably sealed by packing or other sealing to means to prevent air or ozone from moving into or from the housing 22 at the screw holes.

To adjust the tension of the dielectrics 17, the top covers 25 may be removed and screws 35 at one end of the housing backed out slightly to reduce the gripping pressure at this end of the upper spacers 31. Then the tope edges of dielectrics projecting above the spacers 31 may be gripped and pulled upwardly by means of pliers and, when pulled taut, the adjusting screws 35 for this end of the housing are again tightened fully to lock the ends of the taut films against movement. The spacers 29 and 31 are made relatively precisely so that each of the spaces 18 is substantially uniform in depth throughout its entire width and length.

Each electrode 17 with its spacers fixed thereto is identical and is formed with an end protruding beyond the spacers for attachment to suitable electrode connectors 41 and electrical conduits 43. The protruding ends of the electrodes 17 alternate in extending upwardly and downwardly, and the electrodes with their lower protruding ends are connected to ground and the upward protruding ends are connected to a source of electricity. A suitable electrical source provides alternating current which may be within the range of 5,000 to 50,000 volts at a frequency in the range between 50 to 10,000 c.p.s. The resultant silent electrical discharge between the electrodes 17 generates ozone in the gas stream flowing between the dielectrics 15 and the electrodes 17.

It is estimated that about 90–95 percent electrical energy expended in generating the ozone is converted into heat at the generating station 12. This is a considerable amount of heat and it is removed from the generating station 12 by means of the high-velocity flow of the gas stream across the electrodes 17 and the dielectrics 15. The gas stream is drawn from the housing 22 through an opening in housing wall 23 leading to a duct 45 having a decreasing cross-sectional area connected to an inlet pipe 47 leading to the inlet side of the blower 19 which blows the gas stream into an inlet end 51 of the heat exchanger 20. The blower 19 is driven by a suitable motor 53 to provide a desired flow rate and velocity for the gas stream. The power used to pump the gas stream has been found not to be large inasmuch as a greater pressure drop is not experienced about the recycle path. By way of example, the throughput for a conventional, single pass ozone generator may be only a fraction of a ft.$^3$/min. per square foot of generating area, whereas in the present invention the flow rate per square foot of generating area is usually 5 to 8 ft.$^3$/min. per square foot of generating area and may be much higher, e.g., 15 to 20 ft.$^3$/min. per square foot of generating area. The actual velocity and flow rate used in any given installation may vary considerably depending upon the mixture of oxygen used, the amount of electrical power used and heat to be removed, the kind and temperature of coolant in the heat exchanger 20 and the ultimate concentration of ozone desired.

With the thin nonwater-cooled electrodes 17, the amount of exposed surface area relative to the mass of electrode is an extremely high ratio compared to the thicker walled, water-cooled electrodes of the prior art. This results in better and more rapid heat transfer from the electrodes to the gas stream. To achieve good heat transfer, the gas stream may be baffled or otherwise manipulated to become turbulent within the spaces between electrodes and dielectrics so that gas stream will scrub any boundary layer or gas film on the surfaces of the electrodes (or dielectrics) which would deter heat transfer to the moving gas stream.

The preferred manner of operation is a continuous one in the sense that oxygen, oxygen-enriched air or air is continually being supplied through an inlet conduit 55 to the inlet header 51 and at the same rate the ozone bearing gas is being exhausted from an outlet pipe 57. In this instance, the outlet pipe 57 is connected to an outlet header 61 for the heat exchanger 20, although the outlet could be placed at other positions. The infeed or outfeed rate through the conduits 55 or 57 is usually less than about one-fiftieth of the flow rate of the gas stream flowing through the ozone-generating station 12.

The separation of the heat removal function from the ozone-generating function at the generating station 12 permits the use of commercial, efficient heat exchangers 20 of various kinds, such as of the illustrated water-cooled tube type. Such heat exchangers are designed with heat transfer characteristics primarily in mind, rather than having heat transfer characteristics comprised to achieve generation of ozone as in the usual commercial ozone generator. In the illustrated heat exchanger 20, water at about 50° F. is pumped through an inlet pipe 65 and flows through longitudinally extending coils 67 to exit at an outlet pipe 69. Satisfactory heat exchange and equilibrium of operation have been obtained by dropping the temperature of the gas stream from about 85° F. at the inlet header to 67° F. at the outlet header 61 of the heat exchanger 20 so that the gas is at about 67° F. as it flows into the ozone generator 12. The illustrated unit has been operated satisfactory with a 10° to 25° F. temperature drop for the gas stream across the heat exchanger. However, the temperature differential may be varied to meet various operating conditions and expedients available for cooling.

The following examples are given for illustrative purposes with the understanding that the present invention is not to be limited to these examples. Using an apparatus similar to that described herein, air was recirculated through the ozone-generating station 12 by the blower 19 and, under the following operating conditions, the results are as follows:

|  | Ex. 1 | Ex. 2 | Ex. 3 | Ex. 4 |
|---|---|---|---|---|
| No. of electrodes | 18 | 11 | 13 | 13 |
| Generating Area (1 side) | 4.25 Ft.$^2$ | 2.5 Ft.$^2$ | 3.0 Ft.$^2$ | 3.0 Ft.$^2$ |
| Spacing between electrodes | 0.070" | 0.070" | 0.100" | 0.100" |
| Pressure in unit (gauge) | 15.3mm.Hg | 15.3mm.Hg | 33mm.Hg | 33mm.Hg |
| Dielectric (Mylar) | 5 mil | 5 mil | 5 mil | 5 mil |
| Grams O$_3$/hr | 4.2 | 3.03 | 8.2 | 7.45 |
| Grams of feed air/hr. | 304 | 304 | 715 | 860 |
| 0.15 SCFM | | | | |

| % concentration of O₃ (by weight) | 1.38 | 1.00 | 1.15 | 0.87 |
|---|---|---|---|---|
| Recycle Rate | 20 c.f.m. | 11.8 c.f.m. | 20 c.f.m. | 20 c.f.m. |
| Recycle Ratio | 134 to 1 | 78 to 1 | 56 to 1 | 47 to 1 |
| Flow Rate c.f.m./min. per ft.² of generating area | 4.7 | 4.7 | 6.7 | 6.7 |
| Temperature Exit gas from generating station | 85° F. | 82° F. | 81° F. | 88° F. |
| Exit gas from heat exchanger | 67° F. | 68° F. | 57° F. | 67° F. |
| Peak Voltage | 7.0 kv. | 6.9 kv. | 9.9 kv. | 9.6 kv. |
| Power Consumption | watt/hr. | | 200 | 155 |

As used herein, the above listed recycle rates of 20 c.f.m. and 11 c.f.m. refer to the output flow from the blower, and the flow rate is calculated by dividing the recycle rate by the effective generating area of an electrode. It will be appreciated that the outermost ones of the group of electrodes have interiorly facing sides which are effective generating areas and surfaces while their outward facing sides are nongenerating surfaces. Thus, the formula for calculating the total effective generating area for the electrodes is $(n-1) \times 1 \times w$, where $n$ is the number of electrodes, 1 is the length of the exposed side of the electrode and $w$ is the width of the exposed side of the electrode. The above-listed flow rates of 5 to 8 c.f.m. per square foot of generating surface have been exceeded in other tests and good results have been obtained with flow rates ranging between 15 to 20 c.f.m./ft² of generating surface. Better production of ozone may be obtained by using gaseous oxygen as the feed gas rather than air, it being usually found that the production of ozone doubles when oxygen rather than air is the infeed gas.

In other embodiments of the invention, the manner of arranging and supporting the film dielectrics 15 in flat planes parallel to the planes of the electrodes 17 may be changed from that illustrated in FIGS. 1-3 such as, for example, to that illustrated in FIGS. 4-6. In these latter embodiments, the same reference characters with a suffix $a$ or $b$ are used to designate elements which are substantially similar to the elements previously described in connection with FIGS. 1-3.

A prefabricated generating unit 70 (FIG. 4) is formed with a pair of upper and lower spacers 29a and 31a secured along the upper and lower edges of the electrode 17a. On the opposite outer sides 33a of the spacers 29a and 31a, film dielectrics 15a are fastened, the dielectrics being secured as by an adhesive while in a stretched and flattened condition to the spacers. Thus, the dielectrics 15a are held in a tensioned state with both sides thereof flat and smooth and parallel to the faces of central electrode 17a. In use, the illustrated generating units 70 are alternated with bare plate electrodes 17a similar to the bare plate electrodes 17 illustrated in FIGS. 2 and 3. When assembling an ozone generator, the bare plate electrodes 17 a are separated by spacers of insulating material from each adjacent pair of generating units 70 so that the same air gap or space 18a exists between each electrode and each dielectric. With this type of generating unit 70, the tensioned state of the film dielectrics is maintained without subsequent adjustments.

In accordance with a further embodiment of the invention, the electrode 17b (FIGS. 5 and 6) may be in direct contact with a dielectric 15b rather than being spaced midway between a pair of dielectrics 15, as in the embodiment of FIGS 1, 2 and 3. For instance, a generating unit 75 (FIG. 5) is formed with electrodes 15b carried by and in intimate face-to-face contact with the right-hand side of each film dielectric 15b with a passageway or space 18b formed between left side of each dielectric and the next adjacent electrode to the left thereof.

The generating unit 75 may be formed from an elongated web 77 of a suitable dielectric film on which, at longitudinally spaced intervals, are carried electrodes 17b of a generally rectangular shape. The electrodes 17b are alternately placed on the opposite sides of the web 77. The preferred manner of forming the electrodes 17b is by evaporating or electroplating an electrically conductive metal of the web. In this embodiment, the electrodes may be made thinner than the cross-sectional thickness used for the metal plate electrodes 17 and 17a.

The electrodes 17b are alternated on opposite sides of the dielectric web 77 so that the electrodes will all be facing in a similar direction when the web is festooned to form the continuous web into a series of folds. Suitable spacers 78 are inserted into the ends of the folds and the spacers 78 are moved apart to tension dielectrics to a state in which the dielectrics 15b and electrodes 17b are relatively flat and in parallel planes. The spacers 78 space the dielectrics 15b to form the airgaps 18b between the dielectrics 15b.

If it is desired to hold the electrodes and dielectrics against lateral separation, an assembly thereof may be suitably joined together. For example, after electrodes have connected with electrical leads, the assemblage of dielectrics, electrodes and spacers may be held in a suitable form and the opposite ends thereof potted with a thermosetting or thermoplastic resin. When the resin is cured, the elements thereof will be held against movement.

In this instance, the electrodes 17b are exposed directly to the gas stream only along one face, and this results in diminished heat transfer from the electrodes to the stream than when both sides of the electrodes are swept by the gas stream. However, the increased simplicity and economy in manufacture and assembly of the finished ozone-generating means offsets this reduction in available exposed surface area.

From the foregoing, it will be seen that the ozone-generating unit is simple and capable of being constructed at relatively low cost. In this connection, the use of thin films for the dielectrics and thin plates for the electrodes results in less expensive generating surfaces, as compared to the prior art water-cooled tubes or castings. That is, thin film dielectrics and flat plate electrodes provide the desired accuracy and uniformity across large surface areas for generating without use of expensive machining or finishing of water-cooled castings or pipes. By separating the ozone-generating function from the heat transfer function, relatively simple and commercially available heat exchangers may be employed. The reduction of bulk and simplicity of ease and manufacture of the present ozone generator overcomes the bulk and high initial purchase cost of present commercial ozone generators.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. An apparatus for producing ozone comprising, means defining a generating station chamber in which ozone is generated from a gas stream having oxygen therein, a heat exchanger in fluid communication with said generating station chamber for cooling the gas stream as it flows therethrough, means for recirculating said gas stream through said chamber and said heat exchanger, and ozone-generating means in said chamber having flat, planar electrodes and dielectrics of polymeric material for generating a silent electrical discharge for producing ozone in the gas stream, said dielectrics being non-self-sustaining, and means for tensioning said dielectrics to sustain the same in flat planar positions parallel to the planes of said electrodes.

2. An apparatus in accordance with claim 1 in which said dielectrics are in the form of films of about 0.5 to 10 mils in cross-sectional thickness.

3. An apparatus for producing ozone comprising, means defining a generating station chamber in which ozone is generated from a gas stream having oxygen therein, a heat exchanger in fluid communication with said generating station chamber for cooling the gas stream as its flows therethrough, means for recirculating said gas stream through said chamber and said heat exchanger, and ozone-generating means in said chamber having flat, planar electrodes and dielectrics formed of films of polymeric material for generating a silent electrical discharge for producing ozone in the gas stream, said dielectrics being so thin in cross section as to be non-self-sustaining, and means holding said dielectrics in a flat and tensioned state and in planes parallel to the planes of the electrodes.

4. An apparatus in accordance with claim 3, in which said electrodes are nonhollow, flat, planar plates having length and breadth dimensions substantially in excess of a depth dimension whereby said plates have large surface to mass ratios for transfer of heat to said gas stream.

5. An apparatus in accordance with claim 4 in which means are provided for holding said film dielectrics in flat planes and spacing said film dielectrics at uniform spacings from one another.

6. An apparatus for producing ozone comprising, means defining a generating station chamber in which ozone is generated from a gas stream maintained at a substantially constant pressure in its flow into and through said generating station and having oxygen therein, a heat exchanger external to said generating station, duct means connecting said external heat exchanger in fluid communication with said generating station chamber for conveying the gas stream to recycle said gas stream through said external heat exchanger, means in said external heat exchanger providing a separate passageway for the flow of a cooling medium through said external heat exchanger to cool the recycling ozone-bearing gas stream flowing through said external heat exchanger, means for recirculating said gas stream through said duct means and said external heat exchanger at a flow rate in excess of 1 c.f.m./ft.$^2$ of generating electrode surface, and ozone-generating means in said chamber having flat, planar electrodes and thin, flat, platelike dielectrics of polymeric material having a cross-sectional thickness of less than 0.010 inch for generating a silent electrical discharge for producing ozone in the gas stream flowing through said ozone-generating means.

7. An apparatus in accordance with claim 13 in which said flat platelike electrodes and dielectrics have at least one flat planar side thereof in face to face contact.

* * * * *

UNITED STATES PATENT OFFICE
CERTIFICATE OF CORRECTION

Patent No. 3,622,492          Dated November 23, 1971

Inventor(s) Layton C. Kinney

It is certified that error appears in the above-identified patent and that said Letters Patent are hereby corrected as shown below:

Column 8, line 16, change "13" to --6--.

Signed and sealed this 16th day of May 1972.

(SEAL)
Attest:

EDWARD M. FLETCHER, JR.          ROBERT GOTTSCHALK
Attesting Officer                Commissioner of Patents